United States Patent
Gierer

[11] Patent Number: 6,155,948
[45] Date of Patent: Dec. 5, 2000

[54] METHOD OF DETERMINING THE PARAMETERS OF AN AUTOMATIC TRANSMISSION

[75] Inventor: Georg Gierer, Kressbronn, Germany

[73] Assignee: ZF Friedrichshafen AG, Friedrichshafen, Germany

[21] Appl. No.: 09/202,123

[22] PCT Filed: Oct. 16, 1997

[86] PCT No.: PCT/EP97/05698

§ 371 Date: Mar. 4, 1999

§ 102(e) Date: Mar. 4, 1999

[87] PCT Pub. No.: WO98/17929

PCT Pub. Date: Apr. 30, 1998

[30] Foreign Application Priority Data

Oct. 21, 1996 [DE] Germany .......................... 196 43 305

[51] Int. Cl.$^7$ .......................... F16H 31/00; F16H 59/00; G01M 3/26; G01M 19/00

[52] U.S. Cl. .................. 475/123; 74/336 R; 73/117.3; 73/118.1

[58] Field of Search ................... 475/117, 120, 475/122, 123, 127; 74/336 R, 337; 73/112, 117.2, 117.3, 118.1, 862.171, 862.29, 862.31

[56] References Cited

U.S. PATENT DOCUMENTS

| | | | |
|---|---|---|---|
| 4,928,557 | 5/1990 | Takada et al. | 74/867 |
| 4,939,985 | 7/1990 | Von Thun | 73/118.1 |
| 4,982,621 | 1/1991 | Sano | 74/866 |
| 5,072,390 | 12/1991 | Lentz et al. | 74/866 |
| 5,335,567 | 8/1994 | Seidel et al. | 475/123 X |
| 5,456,647 | 10/1995 | Holbrook | 477/154 |
| 5,492,508 | 2/1996 | Tsukamoto et al. | 475/120 X |
| 5,551,930 | 9/1996 | Creger et al. | 475/123 X |
| 5,580,332 | 12/1996 | Mitchell et al. | 475/123 X |
| 5,594,643 | 1/1997 | Birchenough et al. | 74/336 X |

FOREIGN PATENT DOCUMENTS

| | | |
|---|---|---|
| 34 36 190 C2 | 4/1986 | Germany . |
| 2 299 632 | 10/1996 | United Kingdom . |

OTHER PUBLICATIONS

Gebauer, Wolfgang, Rabus, Sieghard: "Eine Prozessrechneranlage für die Serienprüfung automatischer Getriebe von Personenkraftwagen" der Fa. Siemens, Computer–Praxis, H. 5, 1972, S.135–139.

Muller, Peter: "Vollautomatisierte Qualitätssicherung durch Prozessrechner in der Automatgetriebe–Fertigung", ATZ Automobiltechnische Zeitschrift 79, 1977, 1, S. 17–20.

Japanese Abstract, No. 06300668A, dated Oct. 28, 1994 (Honda Motor Co. Ltd.).

*Primary Examiner*—Charles A Marmor
*Assistant Examiner*—Roger Pang
*Attorney, Agent, or Firm*—Davis and Bujold

[57] ABSTRACT

A method for determining parameters of an electrohydraulically controlled automatic transmission (4) by, on a final test bench, successively initiating transmission gearshifts. During gear changes the parameters of the automatic transmission are determined from measuring values transmission input/transmission output speeds (10, 12) and transmission input/transmission output moments (11, 13).

7 Claims, 2 Drawing Sheets

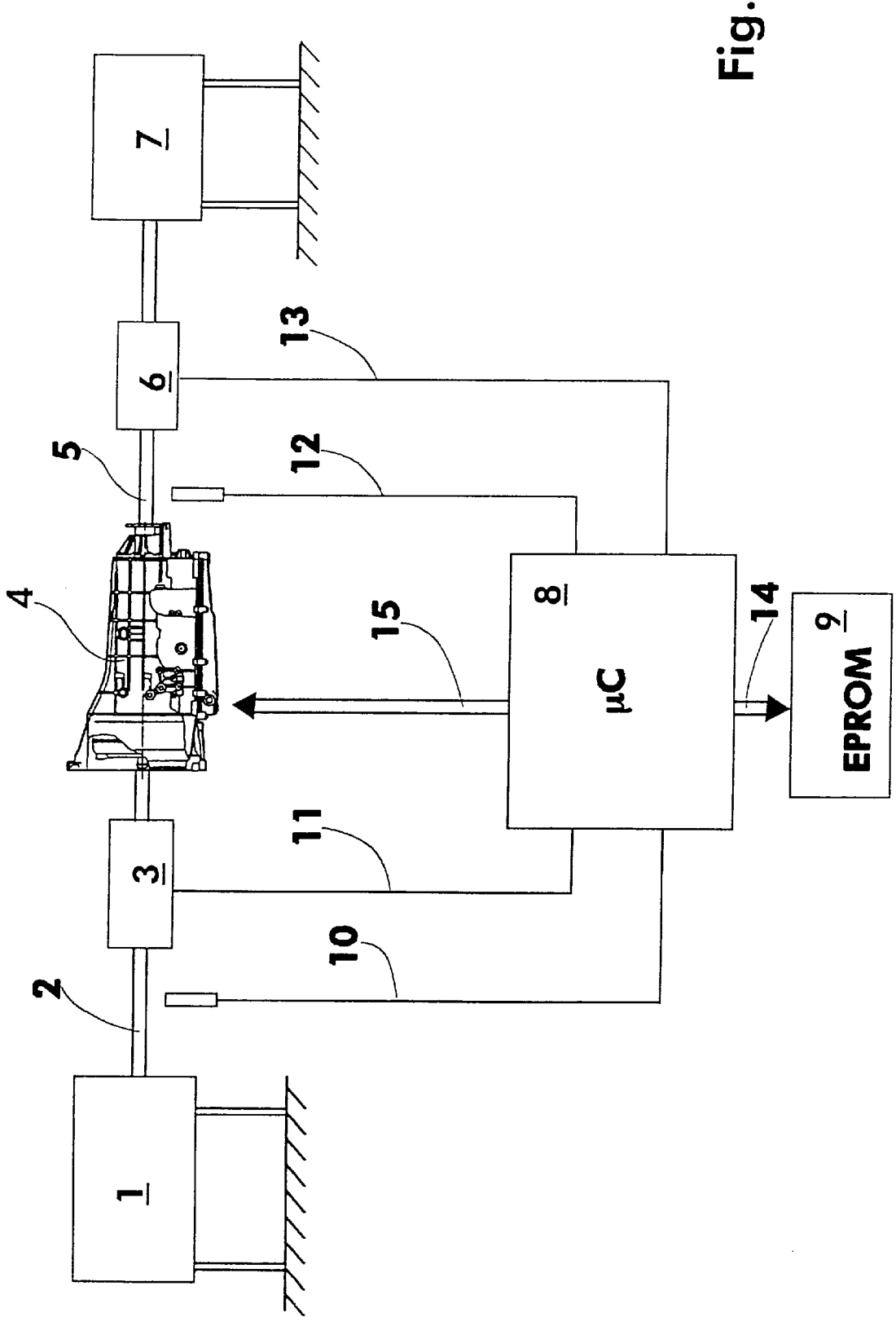

METHOD OF DETERMINING THE PARAMETERS OF AN AUTOMATIC TRANSMISSION

BACKGROUND OF THE INVENTION

The invention relates to a method for determining parameters of an electrohydraulically controlled automatic transmission by successively initiating on a final test bench, transmission gearshifts, and during the gear changes measuring a transmission input and transmission output speed and a transmission input as a function of time.

In electrohydraulic automatic transmissions deviations can occur within the transmission steps through different components or parts. The result of this is that in two identical vehicles, having identical automatic transmissions, the operating comfort can be very differently impaired. It has been sought in the practice to overcome said problem and to obtain a uniform operating comfort by using adaptive functions in an electronic transmission control. Thus, for example, DE Patent 34 36 190 proposes that an actual shifting time be compared with a theoretical shifting time. If the actual value differs from the theoretical value, the pressure level of a clutch involved in the gear change is changed by a presettable amount in the subsequent gearshift in the same gear shift stage. Now if the automatic transmission has to be changed in a customer service workshop, then the adaptive data, stored in the electronic transmission control, no longer coincides with the actual mechanical part of the automatic transmission.

SUMMARY OF THE INVENTION

The problem, to be solved by the invention, is to provide a quicker tying of an electronic transmission control to an automatic transmission.

According to the invention, the problem is solved by a method for determining parameters of an electrohydraulically controlled automatic transmission, on a final test bench, by initiating successive transmission gearshifts. During the gear changes, a transmission input and a transmission output speed and a transmission input and a transmission output moment and the curves thereof are measured in the course of time. From said measured values, a filling time, a charge pressure, a reaction time, a friction value of the discs and a pressurized fluid charge are determined as parameters of the automatic transmission for the clutch to be engaged during the change of gear. Said parameters are then deposited in a memory so that an electronic transmission control unit corrects, according to said parameters, the pressure level and the time of a rapid filling pressure, of the charge pressure and the pressure level of a shift pressure.

The solution, according to the invention, offers the advantage of detecting the whole tolerance chain, that is, control and transmission tolerances. Thereby greater tolerances of parts are possible, which makes possible a more economical production. These parameters, which characterize an existing automatic transmission, are then deposited in a memory. Thus the advantage resulting in comparison with the prior art is that in case of a great difference between actual and theoretical values, the electronic control unit more quickly synchronizes the actual and theoretical values. The electronic transmission control unit already issues an elevated pressure value based on the parameters.

In a development of this it is proposed that the filling time be determined, after initiating the gearshift, by filling the clutch to be engaged with a preset pressure level until the discs abut on each other. The clutch itself still transmits no moment so that the output moment is zero or almost zero.

In a further development it is proposed that the charge pressure be determined by raising the pressure level in the clutch until the moment transmitted by the clutch or the transmission output moment exceeds a limit value.

In a further development it is proposed that the friction value of the discs and the pressurized fluid charge be determined by raising the pressure level in the clutch to a theoretical value and determining the transmission output moment in addition.

In a further development, it is proposed that the reaction time be determined by measuring the time, after initiation of the gearshift, until the transmission input speed falls below the synchronous speed value of the original multiplication stage by a presettable value.

BRIEF DESCRIPTION OF THE DRAWING(S)

An embodiment is shown in the drawings. In the drawings:

FIG. 1 is a system diagram; and

DESCRIPTION OF THE PREFERRED EMBODIMENTS

Figure 2A:
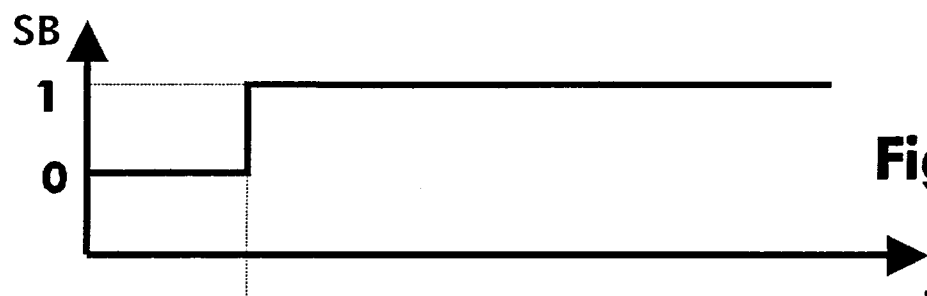
FIG. 2 is a time diagram of an upshift.

FIG. 1 shows a system diagram of the final test bench. In essence, it consists of an input unit 1 (primarily an electromotor), an automatic transmission 4, an inertia mass 7, and a test bench computer 8. The input unit 1 drives the automatic transmission 4 via transmission input shaft 2. A torque indicator 3 is part of the transmission input shaft 2. The transmission input moment M_in is measured by the torque indicator 3. The speed of the transmission input shaft 2 is detected as a second measured value. Obviously, it is also possible to use, instead of the speed of the input shaft 2, the speed of the turbine shaft nT of the automatic transmission 4. On the output side, the automatic transmission 4 is connected by means of a transmission output shaft 5 with the inertia mass 7. A torque indicator 6, which measures the transmission output moment M_out, is a component part of the transmission output shaft 5. The speed nAB of the transmission output shaft is detected as an added measured value thereof. The measured values of the transmission input and transmission output speeds, reference numerals 10 and 13, are passed to the test bench computer 8. The measured values of the transmission input and transmission output moments, reference numerals 11 and 12, are likewise passed to the test bench computer 8. Via a data line 15, the test bench computer 8 initiates gearshifts of the automatic transmission 4. As known per se, this occurs because a first clutch opens and a second clutch closes via electromagnetic actuators, which are part of the automatic transmission 4, a first clutch opens and a second clutch closes. The pressure curve of both clutches involved in the gearshift is controlled here by the test bench computer 8 by means of the electromagnetic pressure regulator coordinated with the clutch. The test bench computer determines from the measured values transmission input, transmission output speeds and transmission input and transmission output moments the parameters that characterize the automatic transmission. Said parameters are stored in an EPROM 9. Obviously, it is also possible to make the parameters of the automatic transmission 4 available in a different manner, such as by a disc or a machine-readable code, which can be read out by the electronic transmission control.

The parameters are additionally determined at a minimum (ΘMIN) and maximum (ΘMAX) temperature, a temperature characteristic line being determined therefrom so that the electronic transmission control unit corrects, in accordance with said parameters and characteristic line, the pressure level and the time of the rapid filling pressure (pSF), the pressure level and the charge pressure (pFull), and the pressure level of the shifting pressure (Psch), the shifting pressure decisively determining the pressure level during upshifts, downshifts and overlapping shifts and gear charge.

Figure 2B:
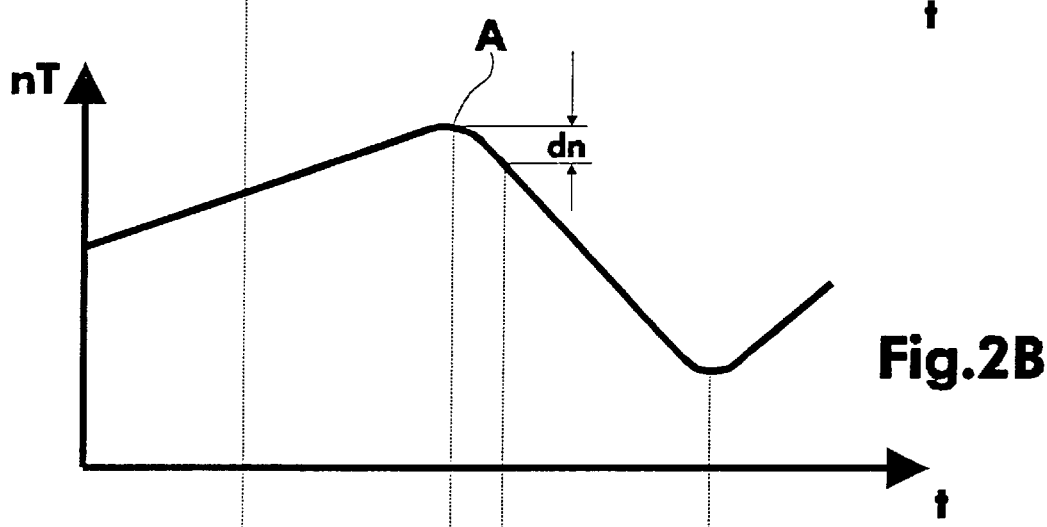
Figure 2C:
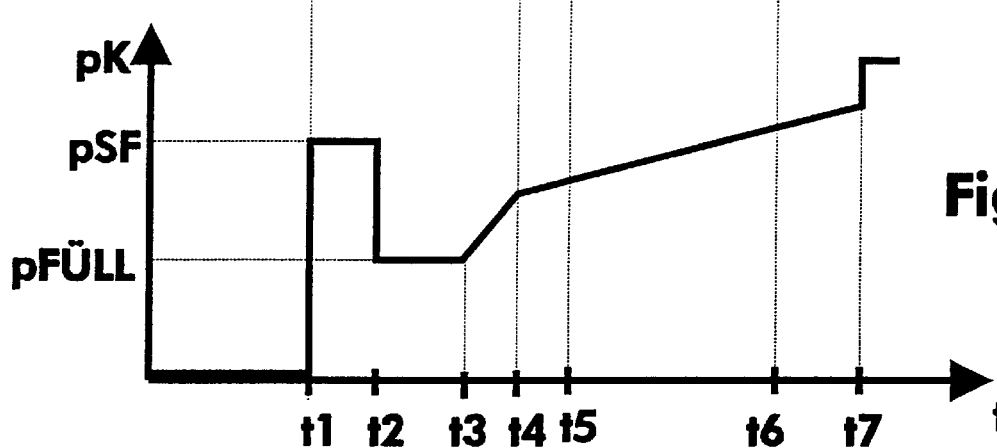
Figure 2D:
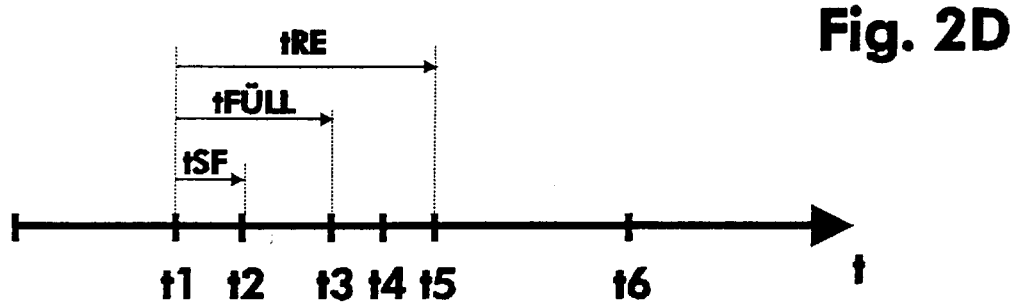

FIG. 2 consists of partial FIGS. 2A to 2D. An upshift in the course of time is shown. Here FIG. 2A shows the time curve of the shift command; FIG. 2B shows the curve of the respective transmission input speed and turbine speed nT; FIG. 2C shows the pressure curve pK of the clutch to be engaged, and FIG. 2D shows the time stages during the gearshift. At the moment t1, the shift command is issued, that is, the level in FIG. 2A changes from 0 to 1. At the same time, the clutch to be engaged is filled with a high pressure level, the rapid filling pressure pSF. The rapid filling lasts for the time interval tSF. As shown in FIG. 2D, the time stage tSF terminates at t2. In the time interval t2 to t3, the clutch to be engaged is filled with a charge pressure pFull. The time stage tFull, see FIG. 2D, terminates when the discs abut in the clutch to be engaged, which still transmits no moment. The test bench computer 8 detects this by the fact that the output moment is zero or almost zero. The charge pressure pFull is determined by raising it until the moment or transmission output moment M_ab transmitted by the clutch to be engaged exceeds a limit value GW so that M_ab>GW applies. The friction value of the discs and the pressurized fluid charge are determined by raising the pressure level in the clutch to be engaged to a theoretical value and simultaneously determining the transmission output moment M_ab in addition. For Example, this can be carried out during the time interval t3 to t4. At the moment t4, the clutch to be engaged starts assuming the transmission input moment M_in from the clutch to be disengaged. This is clearly detectable by the transmission input speed or turbine input speed nT changing at the point in time A, see FIG. 2B. At the moment t5, the transmission input speed has fallen below by a presettable value the synchronous speed value, point A. Herefrom results, according to FIG. 2D, a reaction time tRE from the moments t1 to t5.

As described under FIG. 1, the parameters of the automatic transmission 4, namely, filling time tFull, the friction value of the discs and the pressurized fluid charge, and the reaction time tRE, are stored in an electronic memory EPROM 9. The parameters must be detected only once for each clutch and can then be taken over on other gearshifts. With the aid of said parameters, an electronic transmission control unit can then identify the automatic transmission. In other words: after the automatic transmission has been installed in a motor vehicle, the electronic control unit reads out the parameters. Depending thereon, the electronic transmission control unit changes the pressure level of a rapid filling pressure, the filling pressure and the shifting pressure.

| Reference numerals | |
|---|---|
| 1 input unit | 9 memory |
| 2 transmission input shaft | 10 transmission input speed |
| 3 torque indicator | 11 transmission input moment M_in |
| 4 automatic transmission | 12 transmission output speed nAB |
| 5 transmission output shaft | 13 transmission output moment M_out |

| -continued | |
|---|---|
| Reference numerals | |
| 6 torque indicator | 14 data line |
| 7 inertia mass | 15 data line |
| 8 test bench computer | |

What is claimed is:

1. A method for determining parameters of an electrohydraulically controlled automatic transmission (4) comprising the steps of:
   initiating successive transmission gearshifts on a final test bench;
   measuring, during the gear shifts, as a function of time, a value for a transmission input speed (nT), a transmission output speed (nAB), a transmission input moment (M_in), and a transmission output moment (M_out);
   determining from said measured values, parameters of the automatic transmission for controlling a clutch to be engaged during the gear change, the parameters consisting of, a filling time (tFull), a charge pressure (pFull), a reaction time (tRE), a friction value of the discs, and a pressurized fluid charge; and
   storing the parameters in a memory (9) so that an electronic control unit corrects, in accordance with said parameters, a pressure level and time of a rapid filling pressure (pSF), the pressure level and the charge pressure (pFull), and the pressure level of a shift pressure (pSch), the shift pressure decisively determining the pressure level during upshift, downshift and overlapping shifts and gear introduction.

2. The method according to claim 1, wherein the filling time (tFull) is determined by, after initiating the gearshift, filling the clutch to be engaged with a preset pressure level until the clutch discs abut on each other, with the clutch still transmitting no moment and the output moment being zero or almost zero.

3. The method according to claim 1, wherein the charge pressure (pFull) is determined by raising the pressure level in the clutch (pK) until the moment transmitted by the clutch or transmission output moment (M_ab) exceeds a limit value (GW).

4. The method according to claim 1, wherein the friction value of the discs and the pressurized fluid charge are determined by raising the pressure level in the clutch (pK) to a theoretical value while simultaneously detecting the transmission output moment (M_ab).

5. The method according to claim 1, wherein the reaction time (tRE) is determined by, after initiating the gearshift, measuring the time until the transmission input speed (nT) falls below a synchronous speed value by a presettable value (dn).

6. The method according to claim 1, wherein the parameters are additionally determined at a minimum (ΘMIN) and maximum (ΘMAX) temperature, a temperature characteristic line being determined therefrom so that the electronic transmission control unit corrects, in accordance with said parameters and characteristic line, the pressure level and time of the rapid filling pressure (pSF), the pressure level and the charge pressure (pFull), and the pressure level of the shifting pressure (Psch), the shifting pressure decisively determining the pressure level during upshifts, downshifts and overlapping shifts and gear change.

7. A method for determining parameters of an electrohydraulically controlled automatic transmission (4) comprising the steps of:

initiating successive transmission gearshifts on a final test bench;

measuring, during the gear shifts, as a function of time, a value for at least one of a transmission input speed ($nT$), a transmission output speed ($nAB$), a transmission input moment ($M\_in$), and a transmission output moment ($M\_out$);

determining from said at least one measured value, parameters of the automatic transmission for controlling a clutch to be engaged during the gear change, the parameters consisting of, a filling time ($tFull$), a charge pressure ($pFull$), a reaction time ($tRE$), a friction value of the discs, and a pressurized fluid charge;

storing the parameters in a memory (9) so that an electronic control unit corrects, in accordance with said parameters, a pressure level and time of a rapid filling pressure ($pSF$), the pressure level and the charge pressure ($pFull$), and the pressure level of a shift pressure ($pSch$), the shift pressure decisively determining the pressure level during upshift, downshift and overlapping shifts and gear introduction; and wherein the parameters are additionally determined at a minimum ($\Theta MIN$) and maximum ($\Theta MAX$) temperature, a temperature characteristic line being determined therefrom so that the electronic transmission control unit corrects, in accordance with said parameters and characteristic line, the pressure level and the time of the rapid filling pressure ($pSF$), the pressure level and the charge pressure ($pFull$), and the pressure level of the shifting pressure ($Psch$), the shifting pressure decisively determining the pressure level during upshifts, downshifts and overlapping shifts and gear charge.

\* \* \* \* \*